United States Patent Office 3,445,617
Patented May 20, 1969

3,445,617
ELECTRO-EROSIVE METHOD AND APPARATUS FOR MAKING A DIE MEMBER COMPLEMENTAL TO A DIE MEMBER OF THE RULE TYPE
Lawrence M. Rheingold, Baldwin, and Milton Berlin, Forest Hills, N.Y., assignors to Templet Industries Incorporated, Plainview, N.Y., a corporation of New York
Filed Oct. 23, 1965, Ser. No. 503,911
Int. Cl. B23k 9/16
U.S. Cl. 219—69                                   2 Claims

ABSTRACT OF THE DISCLOSURE

A method and apparatus for making a male member complemental to a female rule die member. The apparatus includes a plenum chamber with a perforate bottom having clamped to it a die block with a rule die projecting from its lower face. The upper face of the die block is held against the perforate bottom wall of the plenum chamber. A fluid dielectric medium is introduced into the plenum chamber and forced out through the bottom wall thereof and through holes in the die block. The chamber and die block are moved toward the workpiece to be electro-eroded.

---

This invention relates to a method and apparatus for making a die member complemental to a die member of the rule type.

More particularly, our invention is concerned with a pair of cooperating die members one of which includes a die rule that is adapted to cooperate with the other complemental die member for the purpose of performing an operation, e.g., blanking, on sheet metal. As is well known in the art, sheet metal which can be operated upon with die members of the foregoing character varies greatly in thickness, from as thin as foil to as thick as one half inch.

The formation of a die member complemental to a die member of the rule type is at the present time, as practiced commercially, a somewhat laborious operation which is considerably more expensive than the operation required to produce the die member of the rule type. Usually, such complemental die member is in the form of a punch. It customarily comprises a steel plate the configuration of which is arranged to match the configuration of the die member of the rule type with appropriate clearances. This steel plate is brough to the desired shape by the use of tools which mechanically cut away metal, e.g., planers, routers, drills, grinders, bandsaws, files, broaches, reamers, etc.

We have previously proposed to simplify the operation of making the complemental die member and to reduce the cost thereof by the use of an electro-erosion machine, sometimes referred to as an electric discharge machine, this improvement being disclosed and claimed in our United States Letters Patent No. 3,120,601, granted Feb. 4, 1964. Although the technique and equipment therein described are capable of producing excellent results, they still impose too great a burden of skill upon operators who make the complemental dies and therefore involve a consumption of time which is not compatible with the advantages and simplicity that should be realized by the use of the electro-erosion process.

It is the principal object of our present invention to provide a method and apparatus of the character described which will enable a complemental die member of the foregoing type to be manufactured speedily and at a low cost by operators having comparatively little skill, whereby to realize fully the potential of the electric discharge equipment.

It is another object of our invention to provide a method and apparatus of the character described which are more sophisticated than those heretofore proposed to the end that a simpler and more rapid mode of operation is achieved.

It is another object of our invention provide an apparatus of the character described including a universal mounting fixture which uniquely facilitates the placement of a die member of the rule type thereon for use as an electro-erosion electrode in such a fashion as to create appropriate flushing flow of fluid dielectric medium through the die member without the necessity of making separate special fluid flow directing means for every different such die member.

More specifically, it is an object of our invention to provide a shower head type mounting fixture for holding a die member of the character described in a manner such that the fluid dielectric medium is applied to a large number of small discrete areas over the back of such die member while said die member is functioning as the machining electrode of an electric discharge apparatus.

It is another object of our invention to provide a method and apparatus of the character described wherein the rule sections of the die member acting as an electrode are held during electro-erosion in a peripherally compressed die block of compressible material, so that subsequent to the electro-erosion step and after the die block is removed from the mounting fixture the degree of compression of said compressible block may be repeated in a die set so as to reposition the die rule sections and all other parts, e.g., punches, carried by said block in correct spatial interrelationship to properly cooperate with the complemental die member formed by electro-erosion.

It is another object of our invention to provide an apparatus and method of the character described in which the compressible die block is of an electrically nonconductive material and in which unique means are employed to ensure the application of operating potential to the electrically conductive die rule sections and other metal parts carried by said block, thereby to ensure efficient, positive and uniform electro-erosion operations by each of these sections and parts of the said die member.

It is another object of our invention to provide a method and apparatus of the character described which employ a special punch in cooperation with the rule die member and the shower head mounting fixture, whereby to simplify the installation and operation of such punch with particular regard to the flow therethrough of the fluid dielectric medium.

It is another object of our invention provide an apparatus and method of the character described which employ a special, but simple, configuration of the compressible block that, in conjunction with the unusual shower head mounting fixture, enables the fluid dielectric medium to be directed against the complemental member at any desired area during electro-erosion, but without the necessity of making special one-of-a-kind fixtures for every different rule die member.

Thus, it is the basic object of our present invention to provide an apparatus and method of the character described which are specially directed to enabling the electro-erosion step to be carried out with a substantially standard rule die member used as the erosion electrode and without the need for designing and building a hand-tailored mounting fixture for each different such member, in order to enable (a) uniformly good application of the fluid dielectric medium to the interelectrode space during an electric discharge machining step, and (b) uniformly good application of operating potential to all parts and sections of such electrode, said electrode after formation of the complemental die member being capable of having the rule sections and punch parts precisely reconstituted for use as a rule die member that matches with correct clearances the formed complemental die member.

Other objects of our invention in part will be obvious and in part will be pointed out hereinafter.

Our invention accordingly consists in the features of construction, combinations of elements, arrangements of parts and series of steps which will be exemplified in the apparatus and method hereinafter described and of which the scope of application will be indicated in the appended claims.

In the accompanying drawings in which are shown various possible embodiments of our invention.

In general we carry out our invention by providing a female rule die which includes a wood die block having kerfs in which metal die rule strips are secured. The strips project from the block a distance in excess of that required for the metal working, the excess subsequently being trimmed off after an electro-erosion step. The die block is secured to the perforate base wall of a plenum chamber. The die block has openings therein. A dielectric fluid is forced through the plenum chamber and the openings in the die block against the work piece to be electro-eroded. This work piece is immersed in a bath of such fluid. Voltage pulses of opposite polarities are applied to the strip and the work piece, as is well known, to perform electro-erosion. The sediment that accumulates is flushed out by the flow of the dielectric fluid. The plenum chamber includes clamping banks which engage the periphery of the die block to compress the same, to hold it in place and to form a seal which minimizes leakage of the dielectric fluid. By virtue of the perforate nature of the base of the plenum chamber, die blocks having holes in various locations can be coupled to the chamber inasmuch as there will always be one or more holes in the plenum chamber to supply the dielectric fluid to any given hole in the die block.

Horizontal resilient flanges carried by the clamping banks engage the undersurface of the die block and press the same toward the base of the plenum chamber. Various arrangements, such as hereinafter described, conduct electricity to the sundry die rule strips and any other elements which may be held by and project beneath the die block.

Figure 1:
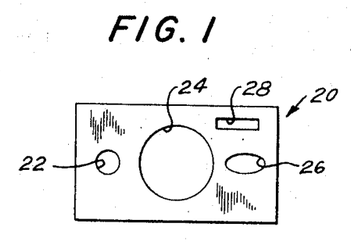
FIG. 1 is a plan view of a typical part blanked from sheet metal with a rule die and a complemental die member.

Referring now in detail to the drawings, in FIG. 1 we have shown a typical sheet metal part 20 which is illustrative of a piece that is to be blanked from sheet metal. The part has been selected to demonstrate various special techniques in the manufacture of a complemental die member pursuant to our instant invention. Said part 20 is of rectangular configuration, this shape having been picked because it is the easiest to which to form a female rule die for blanking. It will be understood that the rectangular outline is merely representative of a myriad number of shapes that might be made.

The piece 20 is provided with a small opening 22, a large opening 24, an oval opening 26 and an elongated opening, or slot, 28. These various through openings have been chosen as typifying the wide variety of shapes and sizes that openings may assume. The small opening 22 is illustrated as circular but it could just as easily have been ovate or polygonal. The large opening 24 likewise has been shown as circular; however, this opening very frequently will be of a highly irregular configuration. The opening 26 has been shown as oval; here too, it is merely representative. The slot 28 has been illustrated as straight; it might also have been curved or composed of angularly related reaches.

The first step in making the complemental die member is the manufacture of the female rule die and this begins with the selection of a die block 30 (FIG. 2) that invariably is of a rectangular configuration, although one or more corners can be chamfered, as at 31. The die block may be conventional, i.e., solely composed of plywood. However, it preferably constitutes a die block which has been specially prepared before cutting out of kerfs or openings to include a conductive surface of the nature discussed above. Such die blocks are shown in FIGS. 3, 4, 5 and 6.

Figure 3:
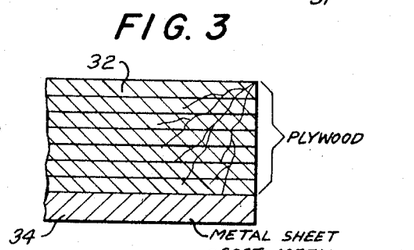
FIG. 3 is an enlarged fragmentary sectional view taken substantially along the line 3—3 of FIG. 2.

The die block illustrated in FIG. 3 comprises a core 32 of laminated dense diemaker's plywood which is standard in the art. Mounted on the lower surface of the core is a metal sheet 34 coextensive with the core. The sheet is composed of an electrically conductive material, aluminum and copper being preferred. The sheet must be able to withstand compression without buckling and yet must be reasonably compressible, so that it will not offer an insuperable resistance to tightening of the peripheral compression means which are employed to place the orthogonal die block in compression and so that when compressed at its edges it will experience compression throughout. Aluminum and copper are also suitable for the foregoing purpose. Desirably, the copper or aluminum is of a soft quality, i.e., not hardened or tempered, in order not to unnecessarily increase the resistance of the sheet to compression. Suitable thicknesses for the metal sheet range from about five thousandths of an inch to about one eighth of an inch, but preferably no more than one sixteenth of an inch. A desirable thickness is one thirty-second of an inch.

The metal sheet is firmly attached to the lower surface of the plywood core in any suitable fashion. For instance, the sheet may be attached to the core by a number of wood screws the heads of which are loosely countersunk flush into the metal sheet and are positioned to be clear of the kerfs and openings subsequently to be cut. A simpler mode which we prefer is to attach the metal sheet to the broad lower surface of the core with an adhesive. Any good commercial adhesive can be employed, typical adhesives being rubber cement and epoxy adhesive.

Figure 4:
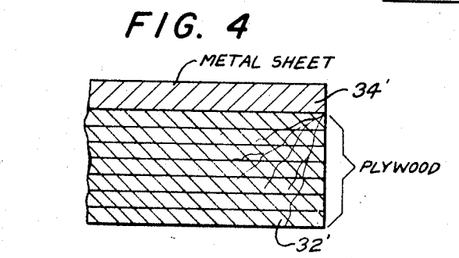
FIGS. 4, 5 and 6 are views similar to FIG. 3 of modified forms of die blocks pursuant to our invention.

The die block shown in FIG. 4 is essentially similar to that seen in FIG. 3, differing therefrom only in that the metal sheet 34' is mounted on the upper rather than the lower surface of the core 32'. Optionally, metal sheets can be secured to both the upper and the lower surfaces of the plywood core.

Figure 5:
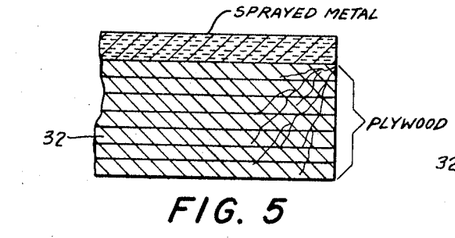

In FIG. 5 we have shown another form of die block wherein the layer of electrically conductive material 36 is a spray metal coating applied in the well-known manner, to wit: with a Schoop-type metal spray gun. Typical metals which can be sprayed to form the desired conductive layer are: aluminum, copper, brass and steel. The sprayed-on layer can be deposited on either or both broad surfaces of the plywood core. If markings are to be inscribed thereon for guides to subsequent kerfing and drilling operations the sprayed-on layer has its exposed surface flat ground and burnished.

Figure 6:
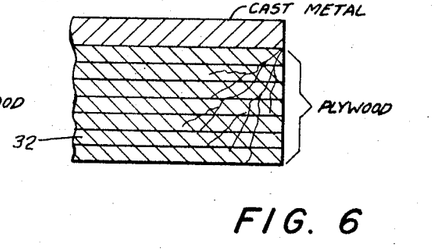
Figure 7:
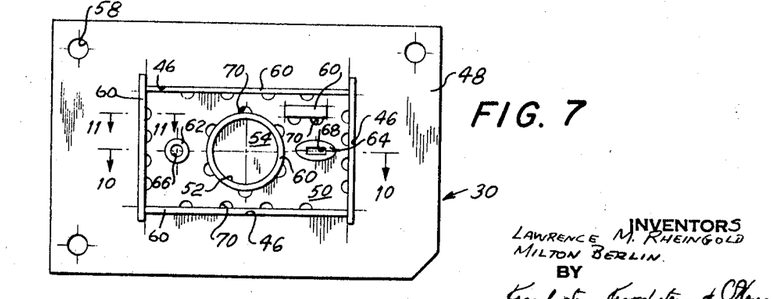
FIG. 7 is a bottom plan view of an assembled rule die electrode embodying certain features of our invention.

In FIG. 6 we have shown still another form of die block, this being one in which the layer of electrically conductive material 38 is applied by casting in situ with a low temperature alloy, e.g., any of the Babbit metals. Where markings are to be inscribed on the cast layer it, too, should be flat ground and burnished.

A line 40 (see FIG. 2) in the shape of the piece 20 to be cut, is laid out on the die block in a conventional manner on one broad surface of the die block, this optionally being the one with the conductive layer thereon. The layout also indicates the positions of the holes 42 to be drilled or cut out for the reception of formed punches and slotting rule sections. In addition, the layout indicates the locations 44 of centering pins.

Figure 2:
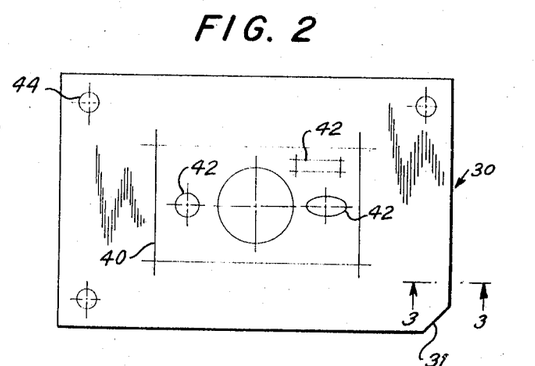
FIG. 2 is a plan view of a die block embodying our invention with the positions of the rule sections and punches laid out thereon.

Next, pursuant to standard rule die practice, with a saw or any other suitable means, a kerf 46 is cut through the die block on the side of the layout line 40 which is toward the scrap. The kerf is of rule width and divides the die block 30 into an outer block 48 and an inner block 50. Also a kerf 52 is cut through the die block for the large opening 24, this kerf likewise being located on the scrap side of the layout line 40. The latter kerf forms an interior plug 54. Holes 56 are drilled or otherwise cut, e.g., handsawed, to form openings corresponding to the openings 22, 26 and the slot 28. Holes 58 are drilled for reception of centering pins.

Figure 10:
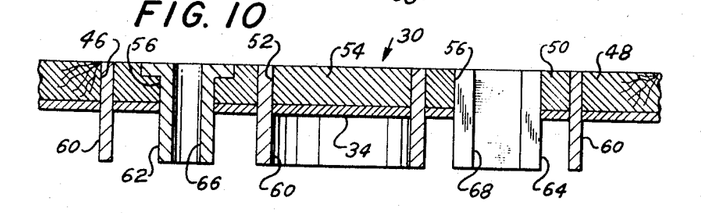
FIG. 10 is a fragmentary enlarged sectional view taken substantially along the line 10—10 of FIG. 7.

Die rule sections 60 are cut, and shaped if necessary, to fit the kerfs 46, 52 and the opening that corresponds to the slot 28. The width of the rule sections is greater than that required for a working rule die by an amount at least sufficient to perform the electro-erosion step on the tool steel plate from which the complemental die member is to be formed. The rule section can be entirely composed of steel as shown in FIG. 10 or can be composed partially of steel and be tipped with an expendable material as described in our U.S. Letters Patent 3,120,601. The total width of the section 60 must be composed of steel for at least an amount that when inserted in the die block will, when flush with the upper face, project from the lower surface sufficiently for use as a female die in accordance with standard rule die practice. The remainder of the projecting width is composed of steel or any other suitable electrode material that is wide enough to function as an electro-erosion electrode that subsequently, after electro-erosion, will be removed. The die sections are inserted in their associated kerfs where they customarily have a snug friction fit.

Figure 8:
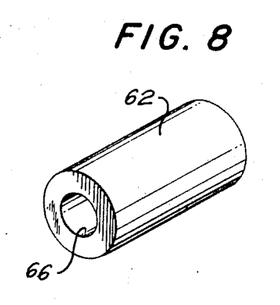
FIG. 8 is a perspective view of a circular, solid, bored punch electrode.
Figure 9:
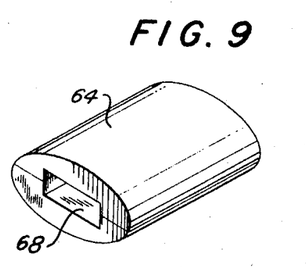
FIG. 9 is a perspective view of an oval, split, bored punch electrode.

Punches are made to the required shape and size. Thus, we make a round punch 62 and an oval punch 64 for the openings 22, 26. Pursuant to our invention, the punches are apertured from end to end. For example, the punch 62 is centrally drilled to form a bore 66. A larger punch such as the punch 64, is split into sections whose matching faces are provided, as by grinding or milling, with registered slots 68 that mutually define the requisite longitudinal end-to-end bore or bores. The punches likewise are inserted in the die block with a snug friction fit. The punches are made of tool steel for at least a length that when inserted in the die block, with an end flush with the upper face, will project from the lower surface sufficiently for use as a punch in accordance with standard rule die practice. The remainder of the length is composed of tool steel or any other suitable electrode material that is long enough to function as as electro-erosion electrode that subsequently, after electro-erosion, will be removed. The lengths of the punches usually are equal to the width of the rule sections, both the larger dimension before electro-erosion and the smaller dimension before sheet metal working.

The die block has cut therein, e.g., with rotary or band files, or a band saw, a series of channels, i.e., grooves, 70 along each kerf. Preferably the grooves are formed along only a single edge of each kerf. Where the kerf forms a boundary of the female die the grooves are disposed on the side of the kerf corresponding to the working edge of the rule die section to be received therein, this being the edge of the kerf corresponding to the edge of the sheet metal piece to be blanked out and is the edge opposite to the rule edge adjacent the scrap. When the rule section is to cut a slot in the sheet metal piece the grooves may be put in either edge of the kerf that receives said section.

The steel die rules and punches may be heat treated and are assembled with the die block, the back (upper) edges of the rule sections and punches being flush with the back (top) of the die block. The only way the assembled rule die differs from a conventional working rule die is in the provision of the grooves 70, the provision of through (end-to-end) holes in the punches, the provision of the conductive layer, and the additional amount the rule sections and punches project from the lower surface of the die to serve as an electrode.

Figures 11, 12:
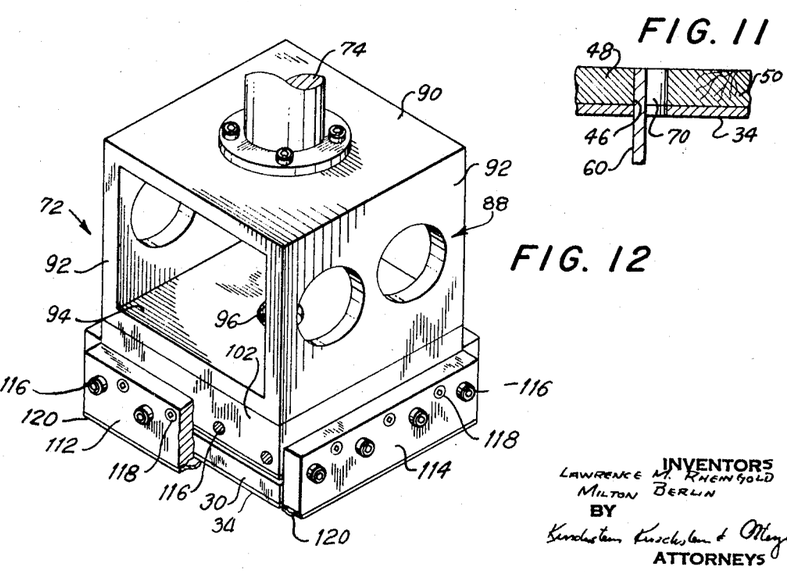
FIG. 11 is a highly enlarged fragmentary sectional view taken substantially along the line 11—11 of FIG. 7.
FIG. 12 is a perspective view of a die mounting fixture embodying another feature of our invention.
Figure 13:
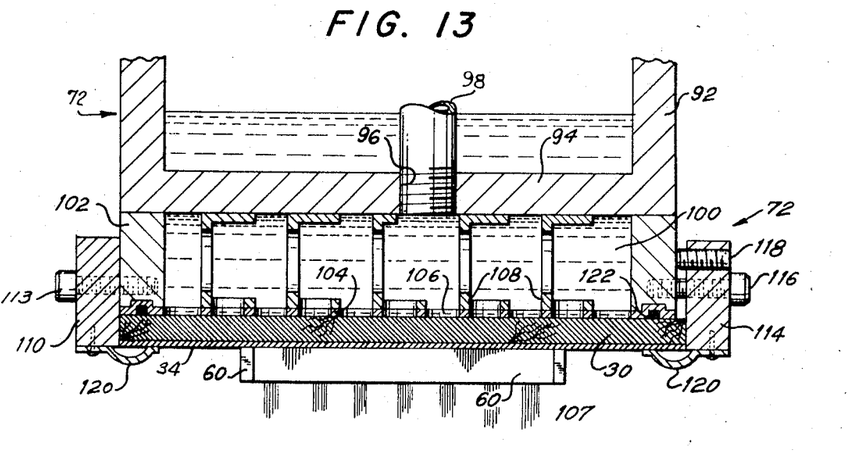
FIG. 13 is a left-to-right vertical sectional fragmentary view through the fixture of FIG. 12 and illustrating an assembled rule die electrode supported therein.
Figure 14:
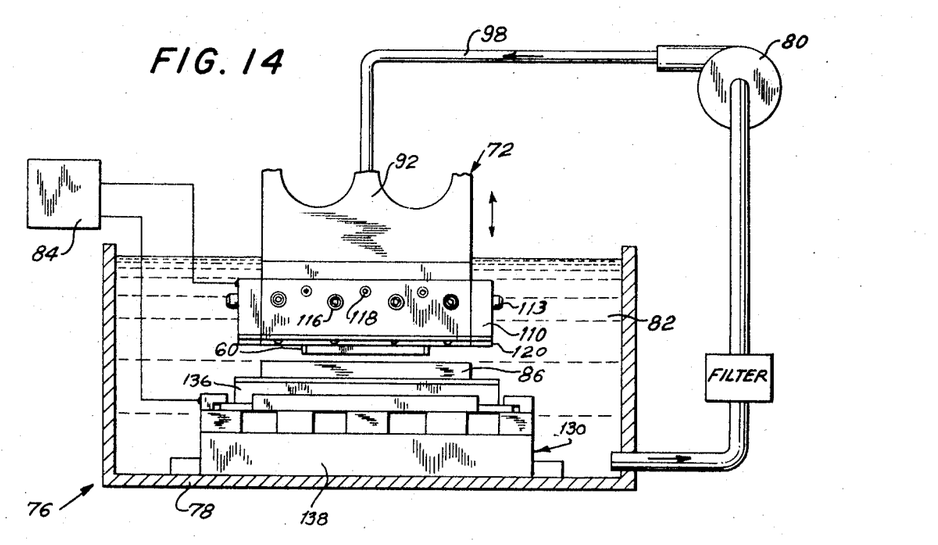
FIG. 14 is a vertical sectional view through an electro-erosion machine in which a die mounting fixture pursuant to the present invention is carried by the quill of the machine.

The assembled rule die (the rule sections and punches in a die block) now is ready to be locked up in a special die mounting fixture 72 embodying our invention (see FIGS. 12, 13 and 14). Said fixture is adapted to support the assembled rule die with its rule sections and punches in the precise shapes, dimensions and relative positions that they will occupy during a sheet metal working operation whereby when the rule die is employed as an electro-erosion electrode a complementary die member will be created which is of an exact matching shape with the desired clearance, the latter being controlled by suitably varying the parameters of the electro-erosion machine, e.g., current, voltage, rate of pulsation, durations of individual pulsations and rate of electrode feed.

The mounting fixture 72 is made fast to the quill, i.e., ram, 74 (see FIG. 12) of a conventional electro-erosion machine 76 (see FIG. 14), sometimes known as an electric discharge machine, having the usual tank 78, circulating pump 80 for the fluid dielectric medium 82, e.g., transformer oil, and power source 84 which supplies a pulsating DC potential of variable voltage amperage, variable pulse rate and variable pulse duration. The machine 76 includes means, not shown, for feeding the quill at any preselected rate, the die mounting fixture 72 and the rule dielectrode carried thereby toward the work to be machined, in this case a tool steel plate 86 located within the tank 78.

The particular structure of the fixture 72 is such that it will properly hold the die block 30 with the rule sections and punches in the aforesaid correct location and it will also supply a flushing flow of the fluid dielectric medium to appropriate locations along the rule sections and the punches. Moreover, it will do this without having to be individually tailored to every rule die that is carried by the fixture. In other words, a single mounting fixture 72 which is adapted to hold a rule die having a die block of certain plan dimensions, automatically will supply the fluid dielectric medium to all proper locations on the rule sections and punches carried by such a die block, regardless of the location of the rule sections and punches in the die block. Moreover, the mounting fixture, in conjunction with the metal surfaced die block, will apply the electro-erosion operating potential to all rule section electrodes and punch electrodes without having to especially hand-tailor the rule die electrode for this purpose.

Referring then in detail to FIGS. 12, 13 and 14, in which the special mounting fixture 72 is shown, said fixture includes a frame 88 in the form of a hollow box having a horizontal rectangular top wall 90 to which the quill 74 is bolted. The top wall may be imperforate although it will function satisfactorily if it has openings therein. The box further includes a pair of parallel vertical side walls 92 each of which is formed with large apertures to permit circulation of the fluid dielectric medium through the box. Finally, the box includes a horizontal rectangular bottom wall 94. The front and back of the box, as shown in FIG. 12, are open to allow free ingress and egress of the fluid dielectric medium. The bottom wall 94 is imperforate with the exception of an inlet port 96 in which there is engaged the discharged opening of a conduit 98 leading from the high pressure side of the oil circulating pump 80.

The imperforate bottom wall 94 of the frame constitutes the top wall of a plenum chamber 100 (see FIG. 13) having a rectangular ring of side, front and back walls 102 which are coextensive with the periphery of the wall 94. It may be mentioned that the inlet port 96 can, if desired, be located in any wall of said ring or in more than one such wall instead of or in addition to the inlet port 96 in the top wall of the plenum chamber. Finally, the plenum chamber has a horizontal bottom wall 104, parallel to the top wall 94, both said walls being precisely perpendicular to the direction of the movement of the quill 74.

Pursuant to our invention, said bottom wall 104 is formed with a myriad of openings 106 that extend through the same from the upper to the lower face thereof. The openings are spaced close to one another so that said bottom wall largely is composed of such openings. By way of example, the openings may be approximately 0.07 to 0.13 inch in diameter with a center to center spacing such that the perforations constitute an open area varying between about 40% and 90% of the total area of the bottom of the plenum chamber. The particular sizes of the openings and their mutual spacing are not critical, it being sufficient that there are a great number of these openings, that they are closely spaced, and that the openings be small enough to prevent the rule sections and punches of sizes that conventionally are used, from falling through the same. Thereby, when a die block with its assembled rule sections and punches is juxtaposed against the foraminous wall 104, there will be an opening very close to, or having at least a portion in vertical registry with a portion of every groove 70 or bore 66, 68 in every punch. We also may totally eliminate the bottom wall 104, in which case the die block 30 constitutes the bottom wall of the plenum chamber. This eliminates the die and rule section backing effect of the perforated bottom wall, but in most instances, the peripheral compression of the die block renders this backing effect unnecessary.

Owing to the inherent weakness of the highly perforated wall 104 which usually constitutes a thin perforate metal sheet affixed to the bottom edges of ring of side, front and back walls of the plenum chamber and despite the fact that this wall is not subjected to any significant stresses, we prefer to rigidify the wall. This may be accomplished, for example, by including a series of spacing elements 108 consisting, for instance, of channel shaped iron bars, each having an upper horizontal flange secured, as by welding, to the undersurface of the upper wall 94 of the plenum chamber, and a lower horizontal flange secured, as by welding, to the upper surface of the bottom perforate wall 104 of the plenum chamber. The vertical reaches of the spacing elements are perforated to permit free flow of the fluid dielectric medium therethrough. In addition, where the bottom horizontal flange of any spacing element crosses an opening 106, such flange is apertured in registry with the opening, thereby to prevent interference with free flow of the fluid dielectric medium.

The bottom wall 104 is reinforced against compressive stress by the thick ring of side, front and back walls 102.

The purpose of the plenum chamber is to form a fluid distribution manifold which, despite the fact that the fluid dielectric medium is introduced at but one or a few localized areas, distributes the medium and supplies the same to all of the orifices in the bottom wall at approximately the same pressure, although, of course, there will be some minor variation.

When the fixture is connected to the quill and located over the tank and the circulating pump 80 is energized without a die block being secured to the fixture in a manner soon to be described, it will be observed that the initial flow of the fluid from the perforated plate 104 will be in a series of small streams located in a small circular area directly beneath the inlet port 96. However, the rate of flow of fluid into the plenum chamber exceeds the rate of outflow through the few openings 106 in said circular area so that the plenum chamber quickly fills up and within a short period of time, for example, about fifteen seconds, the entire volume of the plenum chamber is filled with the fluid dielectric medium under a mild pressure, e.g., from about one to about fifteen p.s.i. which will be less than the pressure at the delivery side of the pump 80. The efflux of the fluid dielectric medium from the large number of openings in the fixture in parallel uniformly spaced narrow vertical streams 107 at low order of pressure resembles the flow of wate from a shower head and hence we refer to the fixture as having a "shower head effect." As observed shortly above, it is this closely spaced relationship of a large number of small fluid streams, i.e., the shower head effect, that enables the fixture 72 to accommodate itself to an infinite variety of rule die electrodes having a common size of die block without having to provide special flow passageways for every different rule die electrode, thereby enabling rule dies to be speedily and efficiently adapted for use as rule die electrodes by comparatively unskilled help and with little training.

Moreover, the special mounting fixture 72 includes peripheral compression means for orthogonally applying compression to all four sides of the rectangular die block so as to squeeze the die block and perform the multiple functions heretofore attributed to this action, to wit: obtain and maintain the special relationship of the rule die sections and punches in the precise desired relative dimensions which subsequently will be necessary for the sheet metal working operation, form a liquid seal around the edges of the die block and effect a good electrical contact between the conductive layer on the die block and the rule sections and punches carried by the die block.

Said peripheral compression means may be of any suitable form and construction and most conveniently constitute four banks, each different bank being supported by a different corresponding edge of the rectangular ring of walls defining the plenum chamber. The four banks are in mutually perpendicular and parallel relationship to jointly define a rectangle corresponding to the rectangular shape of the plenum chamber and slightly larger than the rectangular shape of the die block to be carried by the fixture. All four banks may be movable toward and away from the opposed banks and perpendicular to the sides of the plenum chamber by which they are carried. However, it is simpler to employ two stationary banks and two movable banks.

In particular, we utilize one pair of stationary banks 110, only one such bank being illustrated in FIG. 13. This is the bank which runs in a front-to-back direction at the left side of the plenum chamber (as illustrated in FIG. 12). The second stationary bank (not shown) is in a corresponding location along the back side of the plenum chamber. There are two movable banks 112, 114. These are, respectively, at the front and right sides of the plenum chamber.

The stationary banks are fixedly held in place, as by bolts 113 extending through said banks and made fast to the left side and back walls of the plenum chamber. The two stationary banks approach one another perpendicularly at the back left corner of the fixture as viewed in FIG. 12. Each stationary bank has a portion above the level of the lower surface of the perforate wall 104 by which portion the stationary bank is made fast to the plenum chamber and another portion which protrudes below the lower surface of said bottom wall by a distance approximately equal to the thickness of a die block which is adapted to be received and carried by our special mounting fixture 72.

The two movable banks are shiftably secured to the plenum chamber in identical modes so that the securement of only one will be described. Referring to FIGS. 12 and 13, the righthand movable bank 114 is provided with a horizontal series of bolts 116, each of which extends through a clear opening in the bank 114, and meshingly engages with a tapped bore in the side wall of the plenum chamber. In addition, there are a horizontal series of set screws 118, each of which is threaded in a tapped opening in the bank 114 above the clear openings that freely pass the shanks of the bolts 116. The tips of the set screws bear against the outer surface of the right side wall of the plenum chamber above the bolts 114.

It will be appreciated that each movable bank functions as a lever with the fulcrum either at the tips of the set screws 118 or at the shanks of the bolts 116. When the set screws 118 and bolts 116 are initially tightened, they will force the lower edge of the movable bank 114 against the corresponding side edge of the die block 30. Thereafter, tightening either the set screws 118 or the bolts 116 will increase the compressive force supply by the movable bank 114 to the die block 30, the opposed stationary bank 110 supplying the reaction anvil.

The movable banks are tightened to a predetermined degree which is proper to bring the rule sections and punches into their exact relative positions which will correspond to the desired outline of the piece to be blanked out and to the locations of the openings to be punched out in the piece, less, of course, the clearances which will be built into the die set during the formation of the complementary die member.

It will be observed that the peripheral compression will tend to minimize leakage of the fluid dielectric medium around the periphery of the die block.

It also is preferable to include suitable means for holding the die block in the fixture when the peripheral compression means is loosened so that even if a correct order of steps is not followed, the die block will not be accidentally dropped from the fixture and damaged. Such means has an additional function of minimizing leakage of the fluid outwardly to the periphery of the upper surface of the die block. Specifically, said holding means include flanges extending inwardly from the lower tips of the four banks 110, 112, 114. Rigid flanges will suffice if holding is the only function desired. However, as noted immediately above, we prefer to additionally bias the die block upwardly and, to this end said flanges are made of resilient material, e.g., spring stock. In particular, we provide leaf spring flanges 120, a different one for each bank. Each flange has a shank through which a series of screws pass to hold the flange up against the lower edge of the corresponding bank, and a cantilever-supported arcuate body which curves first downwardly to clear the lower peripheral corner of the die block and then upwardly for its tip to engage the under marginal surface of the die block under light pressure. This pressure forces the die block upwardly into light engagement with the under surface of the perforate bottom wall 104 of the plenum chamber, the pressure being sufficient to substantially inhibit outward leakage of the fluid dielectric medium, which is under mild pressure, beyond the sides of the plenum chamber.

If it is desired to further minimize such outward leakage, and this usually is not of any consequence, except on very large die blocks, a sealing means may be included. Said sealing means, as shown, is in the form of a strip 122 of gasket material, such as natural or synthetic rubber of circular cross-section, which is received in a downwardly facing groove (see FIG. 13) circumscribing the perforated zone of the bottom wall 104 of the plenum chamber and directly below the ring of side, front and back walls 102. The cross-sectional dimensions of the groove and of the strip 122 are such that when the upper surface of the die block presses lightly against the under surface of the perforated wall, the portion of the strip 122 which protrudes below the groove will be forced back into the groove which is large enough to accommodate the same, whereby at such time the upper surface of the die block is butted against the perforated bottom wall. Such arrangement is desirable because it effects a solid contact between the die block and the perforated wall 104 rather than a floating contact which would not be desirable from a precision point of view.

Attention also is again drawn to the fact that when the movable banks are tightened to place the die block 30 under compression, the conductive metal layer on either the top or bottom or both such surfaces of the die block, likewise will be compressed against the rule sections and punches, thus making good positive contact between said conductive layer and the rule sections and punches which is most desirable for effective electro-erosion operation. It will be understood that when the rule sections and punches are inserted into the die block, the snug friction fit they make afford a positive electrical connection with the aforesaid electrically conductive layer. Nevertheless, this connection is made more certain and the contact resistance is minimized by the application of compression through manipulation of the banks 112 and 114. Furthermore, when the banks are tightened to place the die block in compression, portions of the inner faces of the banks engage the exposed peripheral edges of the conductive layer and this engagement likewise is under compression, whereby a firm positive low resistance connection is made between the banks and the conductive layer and, in turn, through the conductive layer to the rule sections and punches carried by the electrically nonconductive die block.

A pulsating electric DC potential is applied from the source of power to the mounting fixture 72, for example, to one of the bolts 114, so that a proper electro-erosion voltage is supplied to the rule sections and punches for electric discharge machining. The values of the potential, current, pulse rate and pulse times are so well-known for electric discharge machining, that no elaborate discussion is needed here. It merely will be mentioned that conventionally the voltage may range from five to thirty thousand volts, the current from ten to twenty-five hundred amperes, the pulse repetition frequency from fifty to three hundred thousand cycles per second, and the pulse duration from one to ten thousand microseconds. The appropriate selection among these parameters will enable rough machining, semifinishing or finishing electro-erosion operations to be performed all as is well-known in the art.

Figure 15:
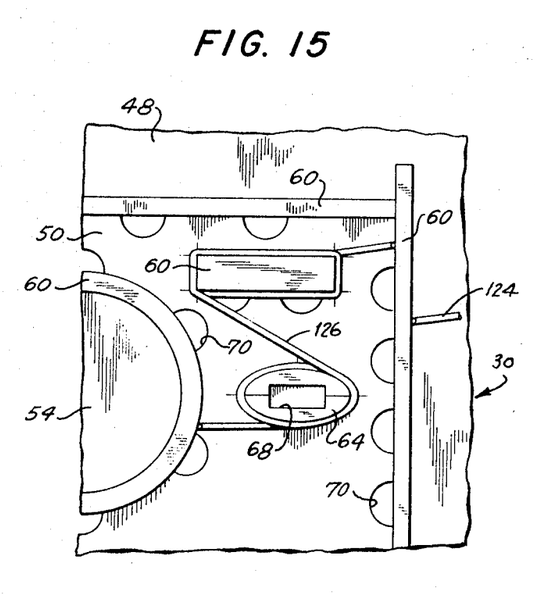
FIG. 15 is a fragmentary enlarged bottom plan view of a rule die electrode assembly embodying a modified form of our invention.
Figure 16:
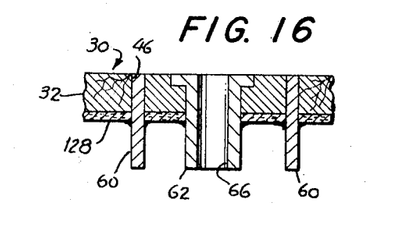
FIG. 16 is an enlarged fragmentary vertical sectional view through a rule die electrode assembly embodying another modified form of our invention.

It may be mentioned at this point that if, for some reason, a die block having a preapplied electrically conductive coating layer on a broad surface thereof is not available, or if the operator or shop for some reason is averse to the use of such a preapplied electrically conductive layer, operating potential can be applied to the various rule sections and punches either as shown in our U.S. Letters Patent 3,120,601, or as shown in FIG. 15, or as shown in FIG. 16.

Referring to FIG. 15, potential is led from our special die mounting fixture 72 to the female rule die composed of the outline section 60 by means of a conductor wire 124 having one end connected to the fixture 72, e.g., caught under one of the bolts 114, and the other end physically and electrically secured to an outline die section 60, as by brazing. If the several outline die sections are not in good electrical contact with one another, additional lengths of wire can have their ends brazed to such different die sections to electrically connect them. A suitable wire for the foregoing purposes is a No. 12 copper wire. Moreover, it is necessary to apply operating potential to the other rule sections and punches carried by the inner block 50 within the female rule die outline and electrically isolated from the outline rule sections. For this purpose an additional conductor wire 126 has one end secured, as by brazing, in good electrical contact with an outline rule section. Said wire is wrapped about the bases of the inserted rule sections and punches, the wire passing from section to section and from punch to section and from section to punch in any desired order, so that ultimately all of the portions of the assembled rule die (inclusive of the punches) which are to serve as an electrode for electro-erosion are electrically connected to the source of power 84.

In FIG. 16 we have shown another arrangement for conveying potential from the fixture 72 to the various components of the rule die which are electrically isolated from one another by the die block and which may not be in good electrical contact with the fixture 72, in particular, may be in poor contact with the perforated plate 104. It will be observed that if the contact is poor, electro-erosion may take place between the plate 104 and the upper ends of rule sections or punches. Pursuant to such alternate arrangement, after the rule die electrode has been assembled and before or after the assembled electrode has been inserted in the fixture 72, a layer 128 of electrically conductive material is applied to the surface of the die block from which the rule sections 60 and punches 62 project.

Said layer 128 is applied in situ as by metal spraying or die casting in the manners heretofore described with respect to FIGS. 5 and 6. Since said layers are applied after the rule die electrode is assembled, the layer will make a good electrical contact with all the projecting portions of the rule sections and punches. Also, if the layer as applied after the assembly is inserted in the fixture, it will make a good electrical contact with the boundary banks 110, 112 and 114 to which electrical potential either is directly applied or is applied from the frame 78 to which one terminal of the source of power 84 may be connected.

The next step in the fabrication of a complementary die member is to effect an actual electro-erosion operation. The fixture 72 is mounted on the quill 74 and carries a rule die electrode assembly. The steel plate 86 from which the complementary die member is to be formed is secured on a floating support 130, for example, a floating support of the type shown in our U.S. Letters Patent 3,150,550. The other terminal of the source of power 84, i.e., the terminal not connected to the rule die electrode assembly, is connected to the floating support 130 which is made of steel, so that potential is led to the plate 86. The potentials are properly applied, so that under the circumstances of operation the rule die electrode assembly will perform electro-erosion on the plate 86 to an extent considerably greater than the electrode itself will be eroded, the selection of parameters to carry out this purpose being well-known.

There are at this time two alternate procedures which can be followed. In one, the rule die electrode may be permitted to burn its way directly through the entire thickness of the plate 86 whereupon said plate 86 will be shaped into a complementary die member which thereafter can be used with the rule die for performing operations on sheet metal. The judicious selection of the parameters heretofore discussed is such as to provide a desired clearance between the two dies (rule die and complemental die) which is desired for the type of sheet metal operation to be carried out.

In the other procedure, the initial electro-erosion step is carried out only far enough to indicate on the plate 86 the outline of all the components of the rule die electrode assembly. That is to say, the electro-erosion is permitted to proceed only to the extent that there is a visible reproduction of the electrode assembly on the plate, the reproduction being on the surface or skin of the plate. Thereafter, the support 130 with the plate 86 thereon is removed from the tank 78. The plate is separated from the support and the plate has metal grossly, i.e., roughly, removed therefrom by standard shop practice procedures such, for instance, as bandsawing, routing, filing or drilling, so that all excess material is removed, except for a minimal amount of scrap, e.g., up to about one-eighth of an inch, the finish removal of which is left for final electro-erosion processing. Then the plate 86 is remounted on the support 130 and the plate and support placed back in the tank 78 in precisely their previous positions. The electro-erosion process is restarted, and this time the rule die electrode assembly is permitted to burn its way completely through the plate. Inasmuch as most of the scrap has been removed by gross methods, the electric discharge machine can proceed much faster than if the electrode had to burn its way through a solid plate, and, moreover, there is less erosion of the electrode assembly. Hence, the final shape of the complemental die member can be made more precise and a better (smoother) finish is obtained. Desired clearance is provided by appropriate selection of the electro-erosion parameters.

When the first method is practiced, i.e., the electrode is permitted to burn through a solid plate, the plate may be hardened and trued before the electro-erosion machining step, thereby avoiding any distortion that might occur by hardening the plate subsequent to electro-erosion. When the second method is practiced, it is preferred to leave the plate soft when the first light electro-erosion step is practiced, so that it will be soft for the gross (rough) machining and removal of excess material therefrom. However, desirably the plate is hardened and trued prior to the final electric discharge machine step.

Figure 17:
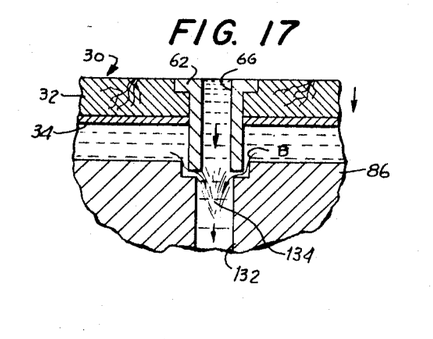
FIG. 17 is an enlarged fragmentary vertical sectional view through a punch electrode and roughed steel plate illustrating the operation of a certain feature of our invention.

It will be appreciated that during the electric discharge machining step the flow of the fluid dielectric medium through the grooves 70 and the punch bores 66, 68 flush sediment out of the interelectrode gap and do so efficiently due to the ease with which said grooves and bores can be provided, so that there will be no disinclination to include sufficient grooves and bores. However, we wish to point particularly to what we believe is a unique advantage of our arrangement which is best shown in FIG. 17.

Attention is called to the fact that a bore 132 is drilled through the plate 86 in the particular procedure which is the second of the ones above described. After the first light electro-erosion step and before the finish electro-erosion step, said bore 132 is aligned with the bore 66 of the punch 62. The bore 132 has been drilled out preparatory to a finishing electro-erosion operation. The diameter of the bore 132 exceeds the diameter of the bore 66 but is less than the external diameter of the punch 62. Therefore, when a jet 134 of fluid dielectric medium issues from the lower end of the punch 62 and centrally into the bore 132, it induces a flow of the dielectric fluid medium from the portion of said medium between the die block and the plate into the interelectric gap and thence into the predrilled bore 132 by an aspiration-like effect which we have found to be particularly efficient for flushing out the interelectrode gap between the punch and plate. Such flow is indicated by the sundry arrows B in FIG. 17.

After the complemental die member 86 has been formed, suitable waste, slug and strip clearance holes are drilled and machined into the adaptor 136 and bolster 138 to pass scrap punched or otherwise removed from sheet metal in a sheet metal working operation.

Also, after the complemental die member has been finished, suitable stripping materials, either resilient or non-resilient, are positioned on either or both of the rule die and complemental member as are required to strip scrap or offal material from the die parts and from the workpiece.

Prior to use of the rule die electrode as a rule die working member, it will be understood that the electrode assembly is removed from the fixture 72, the eroded tips of the rule sections and punches are dressed off, e.g., by grinding, to a common horizontal plane, and so that the sections and punches protrude a proper distance from the end surface of the die block for a metal working operation, and the resulting rule die assembly is secured in a chase such as is shown in our U.S. Letters Patent Nos. 2,850,096 and 3,150,550 where the die block is recompressed to reconstitute the die sections and punches to exact positions occupied by them during the electro-erosion step. Moreover, the outer corners of the rule sections may be chamfered in a conventional manner to reduce the width of the shearing land.

It thus will be seen that we have provided apparatuses and methods which achieve the objects of this invention and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. In a machine for forming a complemental die member from a metal plate by electro-erosion, the combination of a rule die electrode constituting an electrically non-conductive die block from one broad flat face of which rule die electrode sections project, each of said sections having a portion extending from a second broad flat face of the die block to said one broad flat face, at least one of said broad flat faces having a coating thereon of a layer of electrically conductive material which contacts said electrode sections, a die mounting fixture having a flat bottom wall, means for securing said die block to said flat bottom wall with said second broad flat face in juxtaposition thereto, means to apply electro-erosion potential to said coating layer so that said potential is led thereby to said electrode sections, and peripheral compression means protruding below the flat bottom wall of the mounting fixture for receiving and peripherally compressing the die block, said compression means compressing said coating layer to improve the contact between said layer and said electrode sections.

2. In a method of making a rule die electrode assembly for use in the formation by electro-erosion of a complemental die member from a metal plate: that improvement comprising providing a die block of electrically non-conductive material having opposed broad flat faces, applying to at least one of said faces a coating of a layer of electrically conductive material, then forming kerfs in said die block and coating layer, then inserting rule die electrode sections in said kerfs and in contact with said layer, and finally peripherally compressing the die block to improve the electrical contact between the coating layer and the electrode sections.

References Cited
UNITED STATES PATENTS

| | | |
|---|---|---|
| 2,374,348 | 4/1945 | Harding. |
| 2,699,424 | 1/1955 | Neiter. |
| 2,885,529 | 5/1959 | Nelson. |
| 2,909,641 | 10/1959 | Kucyn. |
| 2,981,868 | 4/1961 | Severson _______ 174—68.5 X |
| 2,996,602 | 8/1961 | Webb. |
| 3,022,369 | 2/1962 | Rayburn _______ 174—68.5 |
| 3,120,601 | 2/1964 | Berlin et al. |
| 3,144,541 | 8/1964 | Hill. |
| 3,334,212 | 8/1967 | Kirschenbaum. |

RICHARD M. WOOD, *Primary Examiner.*

R. F. STAUBLY, *Assistant Examiner.*